US007885398B2

(12) United States Patent
Chandra et al.

(10) Patent No.: US 7,885,398 B2
(45) Date of Patent: Feb. 8, 2011

(54) MULTIPLE CRITERIA BASED LOAD BALANCING

(75) Inventors: Neeraj Chandra, Ottawa (CA); Gerardo Martin Espinosa, Plano, TX (US)

(73) Assignee: Alcatel Lucent, Paris (FR)

( * ) Notice: Subject to any disclaimer, the term of this patent is extended or adjusted under 35 U.S.C. 154(b) by 1374 days.

(21) Appl. No.: 11/367,401

(22) Filed: Mar. 6, 2006

(65) Prior Publication Data
US 2007/0206762 A1 Sep. 6, 2007

(51) Int. Cl.
*H04M 7/00* (2006.01)
(52) U.S. Cl. ............................ 379/221.01; 379/221.05; 379/221.07; 370/237; 370/238.1; 709/235
(58) Field of Classification Search ................. 370/238; 379/221.01–221.04
See application file for complete search history.

(56) References Cited

U.S. PATENT DOCUMENTS 5,754,543 A * 5/1998 Seid ............................ 370/351

| | | | | |
|---|---|---|---|---|
| 6,697,333 B1 * | 2/2004 | Bawa et al. | ................. | 370/238 |
| 7,443,800 B2 * | 10/2008 | Imai | ............................ | 370/238 |
| 2002/0071542 A1 * | 6/2002 | Hedden | ................. | 379/221.02 |
| 2003/0204616 A1 * | 10/2003 | Billhartz et al. | ............. | 709/235 |
| 2006/0002368 A1 * | 1/2006 | Budampati et al. | .......... | 370/351 |

* cited by examiner

*Primary Examiner*—Fan Tsang
*Assistant Examiner*—Ibraham Sharifzada
(74) *Attorney, Agent, or Firm*—Kramer & Amado, P.C.

(57) ABSTRACT

This invention provides the ability to load balance calls in a communications network using a certain criterion, such as a user-specified call priority, or the call service category. The method is applied when selecting a route for a new call or for re-balancing the calls across a network. When the user-specified call priority is used, the aggregated number of calls with the same priority or service category is calculated for all possible routes the new call may use. The aggregated number of calls is then divided by the number of hops in the respective routes; the route with the smallest ratio is selected for the new call. Re-balancing is performed by re-routing the calls in such a way as to obtain a similar number of calls of the same priority, or service category along all possible routes.

15 Claims, 3 Drawing Sheets

MULTIPLE CRITERIA BASED LOAD BALANCING

RELATED US PATENT APPLICATIONS

Co-pending U.S. patent application Ser. No. 11/367,402, entitled "Prioritized connection load balancing, Chandra et al., filed on even date, and assigned to Alcatel.

FIELD OF THE INVENTION

The invention is directed to a method and apparatus for load balancing the calls within a switched network based on a user-specified set of criteria, and in particular to PVC (permanent virtual connections) switched digital networks.

BACKGROUND OF THE INVENTION

PVC switched digital communications networks such as e.g. ATM (Asynchronous Transfer Mode) networks are widely used for high-speed broadband data transport. In this type of networks, once a call is established, it will use generally the same route for the life, unless a physical link of the route becomes unavailable, in which case the call is rerouted. Various routing criteria are used for centrally provisioning communication sessions between users of such networks. Some of the currently used criteria are cost of the route, number of hops along a route and bandwidth load of the respective route.

Since a communication network has at its disposal limited resources (link bandwidth and node processing capacity) to ensure efficient data transmission, efficient use of the resources is an important requirement. When traffic demand increases, a network may become congested, resulting in degraded network performance. On the other hand, for proper operation, a network must be implemented so as to avoid congestion. The simplest solution obviously is to increase the capacity of the network; however this solution is generally undesirable for evident reasons of costs. Other less obvious solutions in support of efficient network operation consist in applying preventive measures, of which the main one is load balancing. Load balancing attempts to fairly distributing the traffic over all the links of the network to avoid a local congestion in particular resources and to better utilize the resources across the network.

Currently, the most common criteria for load balancing are based on determining an aggregated BW (aggregated over multiple hops) for each possible route for a call, and selecting the route with the lowest aggregated utilization for a new call. This is for example described in the U.S. Pat. No. 6,697,333 (Bawa et al.) entitled "Bandwidth load consideration in network route selection", issued on Feb. 24, 2004 to Alcatel. The patent describes load balancing methods applicable to both new calls and existing connected calls, using bandwidth load as a selection criterion in addition to route cost and number of link hops in a route. Particularly, the method described in the patent selects the path (route) for a call from alternative paths having equal least cost, and then equal least number of link hops, a path having the less average bandwidth represented as an aggregate of bandwidth usage for each link hop.

The problem with this approach is that the users do not have any involvement in the routing of their calls. But, in order to successfully manage the traffic across a PVC switched digital network it is important not only to allocate sufficient bandwidth for each connection from the knowledge of the source characteristics and the network status, but also to take into account user-specified criteria. Such criteria may be the a user specified calls priority, that indicates the relative importance of calls in the network and ultimately the order in which calls can be eventually released or submitted to a degradation of their quality of service. Another criterion could for example be the service category of the calls, or combinations of the above criteria, applied in a specified order, or subsets of the above criteria, etc.

Thus, there remains a need to provide a route selection method that takes into consideration user-specified criteria.

SUMMARY OF THE INVENTION

It is an object of the invention to provide a method of routing calls in a PVC switched digital network that alleviates totally or in part the problems associated with the current method of routing calls.

It is another object of the invention to provide a method of routing calls in a PVC switched digital network that performs load balancing of calls based on various user-specified criteria.

A further object of this invention is to provide a method of routing calls in a PVC switched digital network that takes into account user-specified call priorities for both new and existing calls, in order to perform a multiple criteria based load balancing.

Accordingly, the invention provides a method of routing calls across a communication network with per-call load balancing, comprising: a) identifying at least two possible alternate routes for a new call; b) determining a route performance value for each the possible route, for a call attribute corresponding to a user-defined load balancing criterion; and c) selecting a route for carrying the new call based on the route performance value.

The invention also provides a method of re-routing a call-in-progress established along a current route across the network between a source and a destination across a communication network, comprising: identifying at least an additional possible route for the call-in-progress between the source and destination; determining a route performance value for the current route and the additional possible route, based on a call attribute corresponding to a user-defined load balancing criterion; comparing the route performance values for the current route and the additional possible route, to determine a best route; and re-routing the call-in-progress along the best route.

According to a further aspect, the invention is directed to a system for load balancing calls between within a communication network using a user-defined load balancing criterion, comprising: a routing module for selecting a plurality of possible alternate routes between user-specified source and destination; a load balancing criteria module for establishing a call attribute based on the criterion defined over an user interface; a link attribute processing unit for determining a link performance value for each link of each possible route based on the call attribute; an aggregated attribute calculation unit for determining a route performance value for each possible route, based on the link performance values; and a route selector for selecting a route for a new call from the possible alternate routes, based on the route performance value.

Still further, the invention provides a system for load balancing calls between a source and a destination within a communication network, based on a set of user-defined criteria. The system includes a routing module for selecting all possible alternate routes between the source and the destination; a load balancing criteria module for establishing a set of call attributes based on the set of user-defined criteria received over an user interface; a link attribute processing unit for determining a link performance value for each link of each possible route and for each call attribute of the set; a plurality of aggregated attribute calculation units, each aggregated attribute calculation unit for determining a route performance value for a given call attribute of the set for all possible routes, based on the link performance values for the respective call attribute and the respective possible route; a scoring unit for each possible routes, each scoring unit for providing a route score, based on the route performance for each call attribute of the set; and a route selector for selecting a route for a new call to be routed between the source and destination, based on the route score.

Advantageously, with the method of the invention, the calls are distributed across the network according to both the specific network configuration and user-specified criteria. This approach results in prioritizing the calls as desired by the users, a better failure response, lower costs to the users. Reducing the effects of service outages on high priority connections is a valuable feature from both the customers' and service provider's point of view. Higher cost routes may for example be assigned to carry high speed traffic of lower priority, since such routes may not be fully protected, while high priority calls may be routed on shorter paths, with high redundancy, as specified by the respective user. Or, the service provider and the users may decide to route the calls based on load balancing cable utilization aggregated over multiple hops, before or after applying to route selection the user specified criteria.

Another benefit of this approach is that the operator has more control over how calls are distributed across the network, to best fit customer's needs with the network capabilities.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

The invention described herein is best suitable for load balancing in PVC switched digital networks (such as an ATM network) and is preferably implemented in the networks equipped with a network management system (NMS). A PCV is a connection defined at subscription time and provisioned by the NMS. The invention might also be implemented at a switch level for soft permanent virtual connections (SPVC). A SPVC is a signaled PVC, which is set up on demand via a signaling protocol, and automatically re-established after a system restart.

The method and system described here use an aggregated load balancing approach based on various sets of criteria. Call routing or/and re-routing may be performed on a per-call basis as well as at the network level (applied to all calls in that network).

Figure 1:
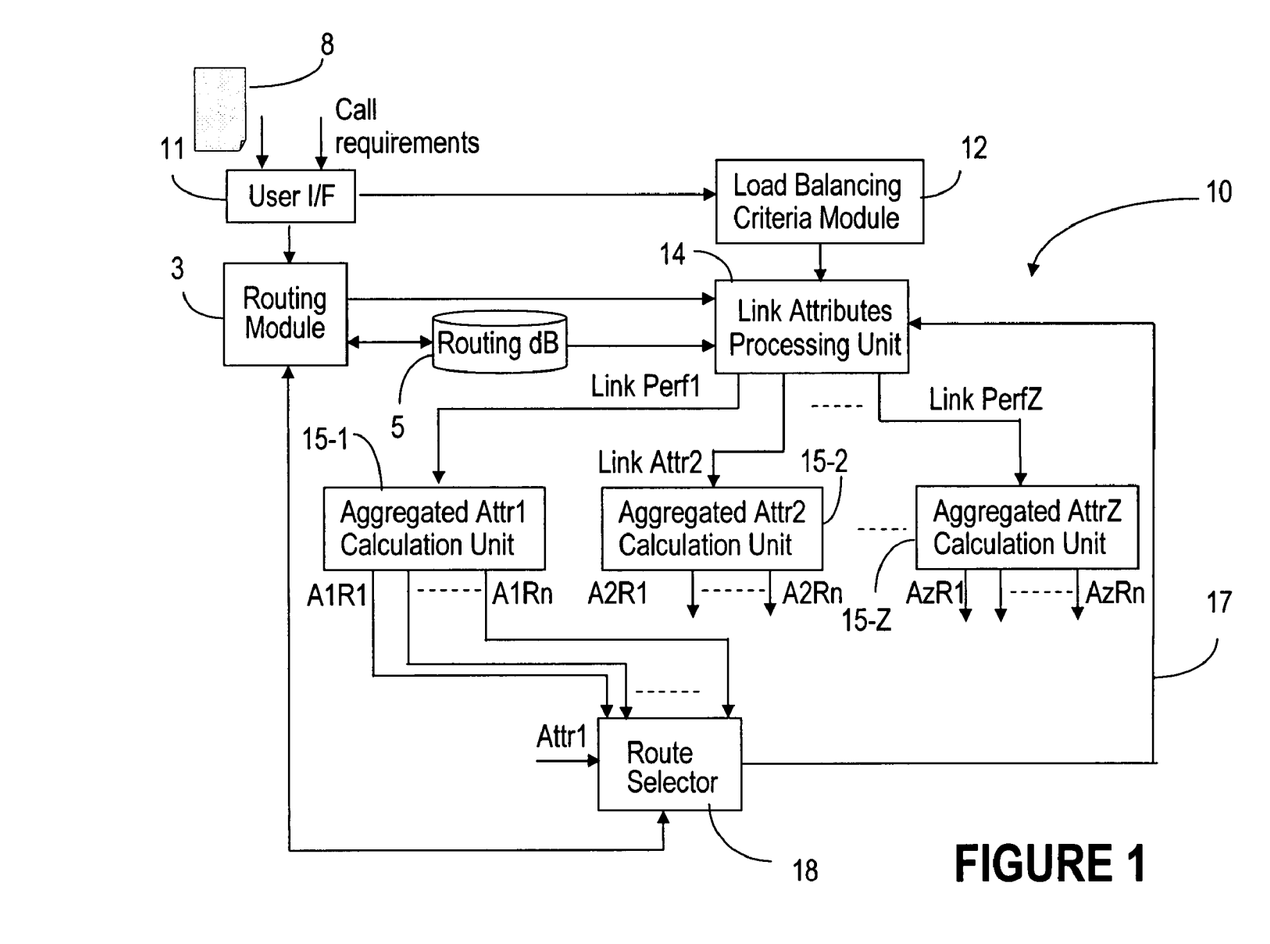
FIG. 1 shows the block diagram of the load balancing system according to the invention.

FIG. 1 shows the block diagram of the load balancing system according to the invention. The term "route" is used to define a physical path between a source and a destination, specifying all intermediate nodes (hops) of the respective communication network. The term "link" is used to define the portion of the route between two consecutive nodes along the route. The term "call" is used here for a path (facility) across the switched network between a source and a destination established by a set of cross-connections expanding one or more network elements. A call can be routed along a plurality of physical routes/paths, referred here as "possible routes".

A call is also defined by one or more attributes. An example of a user-specified call attribute (or a user-specified attribute) is the call priority, or a call service category, call bandwidth, etc. Attributes of a call may also be specified by the operator, derived from his/her knowledge of on-going events, etc. It is to be noted that the attributes specified above are only by way of example and that the invention is not limited to the above listed attributes. The attributes are denoted in the following with Attr1, Attr2, . . . AtrZ; all call attributes irrespective if they are user (client or operator) specified or resulting from network constraints are referred here collectively as "call attributes" or "attributes".

According to the invention, a user may specify a number of attributes to be used for load balancing; in which case these attributes are referred to as "criteria".

As seen in FIG. 1, the load balancing system 10 includes a load balancing criteria module 12, a link attribute processing unit 14, a plurality of aggregated attribute calculation units 15 and a route selector that are used for applying the load balancing criteria for route selection. FIG. 1 also shows a user interface 11 for enabling a user to specify the call requirements, such as call source and destination, bandwidth, preferred routing restrictions, etc., to a routing module 3 present at the node, for enabling the routing module 3 to prepare a list of possible paths that satisfy these requirements According to the invention, the user can also specify through a configuration form 8 which criteria system 10 should use for load balancing, and the order in which to look at these criteria. Unit 12 processes the data from the configuration form 8 and configures system 10 accordingly. Namely, unit 12 provides link attributes processing unit 14 with the criteria to be used, and the order of their applicability.

According to the invention, the routing module 3 selects the possible routes for the respective call based on network configuration information and the current network map stored in a database 5. The possible routes are denoted with R1 to Rn in FIG. 1. Database 5 may store for example data derived from the current network SW configuration, HW configuration, such as the number of the nodes along each selected possible route, the processing power (e.g. switching capacity/maximum allowed bandwidth, number of connections allowed) of the nodes, the type of the links (fiber, cable, wire, wireless, the current state, and the length, etc., which all are taken into consideration when the possible routes are calculated. The number of nodes (hops) is used for calculating average values, as seen later. The cost of a link is defined by a user and it is used for calculating the route cost. Other data may be stored in database 5, which may be used as selection criteria for the path.

Routing module 3 may be enhanced with the capability of first selecting from the possible routes provided by the routing module only the routes that have the lower cost, or the lower number of hops, etc. These design options may simplify the load balancing process on the expense of a less precise balancing.

The link attributes processing unit 14 receives the list with the possible routes for the call of interest from routing module 3, the selection criteria from load balancing criteria module 12, and also receives from database 5 the link attributes specified by the selection criteria. Link attributes processing unit 14 then determines a link performance value, denoted with Link Perf1 to link PerfZ on FIG. 1, for each link of a respective route and for the respective attribute Attr1 to AttrZ, and provides this link performance value to a respective aggregated attribute calculation unit 15-1 to 15-Z. For example, in case when bandwidth balancing is performed, link attributes processing unit 14 determines the bandwidth consumed by all calls-in-progress along each link of routes R1 to Rn and provides this link performance values to aggregated attributes calculation unit 15-1, along with the number of links on the respective routes. If load balancing based on call priority is performed, the link performance value provided by the link attributes processing unit 14 is the number of calls of that given priority (the priority of the new call) for each link of each of the routes R1 to Rn.

Each aggregated attribute calculation unit 15-1 15-i, to 15-Z is responsible with calculating an aggregated value of a respective attribute Attr1 to AttrZ for each possible route R1 to Rn; the aggregated attributes are denoted with AiRj, where i is the index of the aggregated attribute calculation unit (e.g. unit 15-i), and j is the index for a respective possible route. An aggregated attribute calculation unit performs a specific operation on the calls on each link of a respective route, which depends on the nature of attribute. For example, in case of bandwidth balancing, the total BW of a route is obtained by summing the link bandwidth received from unit 14. Or, the call priority aggregated attribute is obtained by adding the link calls received from unit 14 for the respective route. It is to be noted that the total number of aggregated attribute calculation unit may be less than the number of all possible attributes intended to be used by the system for load balancing. This is because some of the calculation units can be re-used for calculating aggregated attributes of similar nature. For example, the aggregated attribute calculation unit used for call priority can also be used for call service category.

Aggregated attribute calculation units 15 preferably average the aggregated attribute over the number of hops of that route. Averaging is however not necessary if the possible routes have the same number of links. To generalize, each unit 15-1 15-i, to 15-Z estimates the performance of the possible routes with respect to the respective attribute, referred here as route performance value; the method of assessing the route performance depends on the attribute.

A route selector 18 selects the route for a new call based on the route performance with respect to a certain criteria, by comparing the route performances of all possible routes and selecting the route with the best performance value; the definition of the best performance also depends on the attribute. For example, for the bandwidth attribute, the route with the minimum bandwidth consumed obtains the best performance value; for the call priority attribute, the route with the minimum average number of calls of that priority gets the best performance value, etc.

FIG. 1 shows only connections for selection of a route based on the first attribute Attr1 for simplicity; it is to be understood that the other aggregated attribute calculation units interact in a similar way with unit 18.

Route selector 18 then passes the selected route to routing module 3 which then enables routing of the call on the selected route. The system shown in FIG. 1 enables load balancing based on a user-specified criterion, such as call service category, priority or bandwidth, etc.

It is to be noted that the load balancing criteria may be applied in sequence, such as first the route with the lowest cost is selected, then, if the route selector returns more than one selected routes with the same cost, the call priority criteria is next applied to these selected routes, and so on. In order to enable the system to repeat the selection for the next attribute, the identity of the selected routes for the respective attribute is provided to the link attribute processing unit 14, so as to enable unit 14 to repeat the process for the next criterion. For example, if the first load balancing criteria is priority and the second is service category, if two routes have the same priority, as determined by route selector 18 from the results received form aggregated attribute calculation unit 15-1, the identity of these routes is returned to unit 14, as seen at 17, to enable link attributes processing unit 14 to instructs a respective aggregated attribute calculation unit (e.g. unit 15-2) to determine the performance of these selected routes with respect to call service category.

Figure 2:
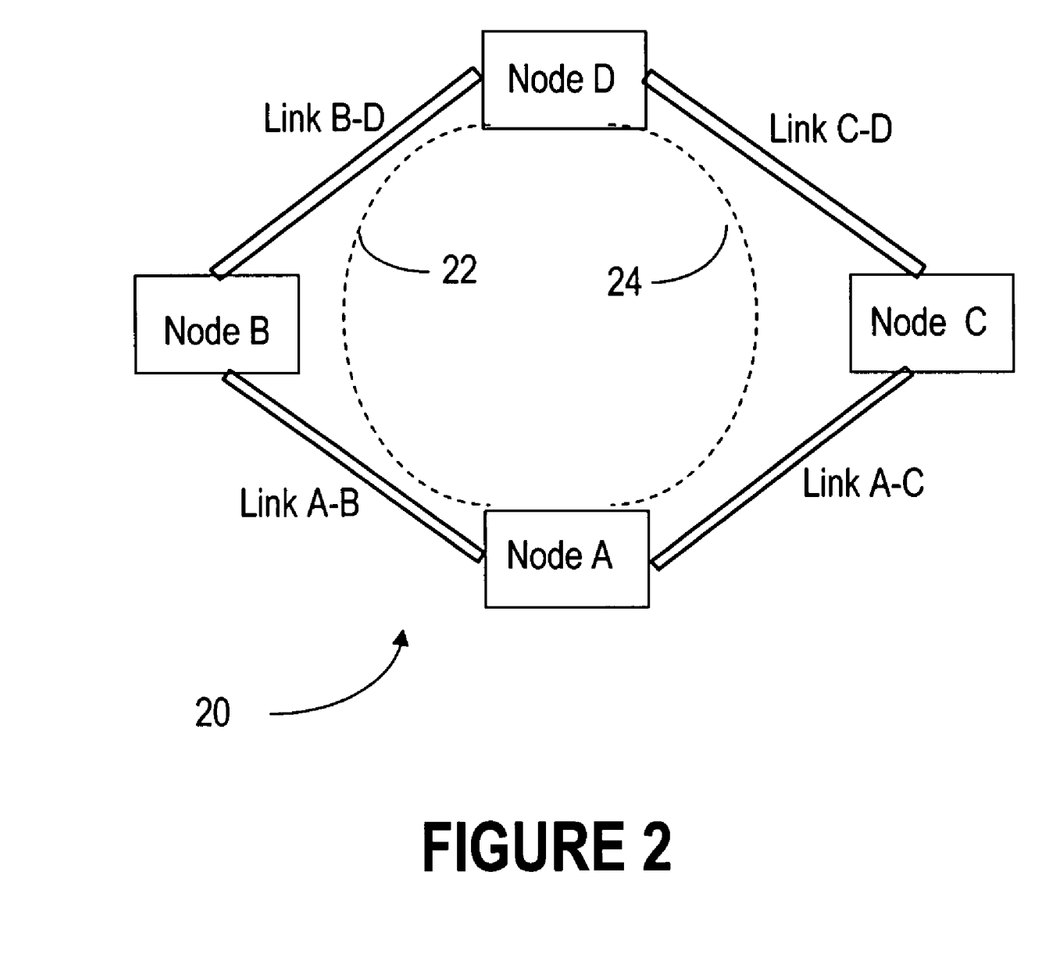
FIG. 2 shows a four nodes network for providing examples of load balancing method of the invention, for various criterions and sub-sets of criteria.

FIG. 2 illustrates a few examples of the operation of the system 10 of FIG. 1 on a network 20 with four nodes A, B C and D. In this example, the nodes are connected as shown by links A-B, A-C, C-D and B-D; all links have in this example a maximum capacity of 100 Mbs. Also, for the sake of simplicity, we assume there could be only three service category levels, where Q1 is the highest, Q2 is the medium and Q3 the lowest. Similarly, we assume that there are five user specified priorities available, where P1 is the highest priority and P5 is the lowest. The links have calls traversing them with the attributes specified in the Table 1 below:

TABLE 1

|  | Link A-B | Link B-D | Link A-C | Link C-D |
| --- | --- | --- | --- | --- |
| No. of calls (N) | 5 | 10 | 8 | 8 |
| BW Consumed | 10 M | 25 M | 10 M | 20 M |
| Priority (P) | 3 × P5, 1 × P2, 1 × P1 | 4 × P5, 5 × P2, 1 × P1 | 3 × P5, 3 × P2, 2 × P1 | 3 × P5, 3 × P2, 2 × P1 |
| Service category (Q) | 1 × Q1, 2 × Q2, 2 × Q3 | 3 × Q1, 5 × Q2, 2 × Q3 | 1 × Q1, 5 × Q2, 2 × Q3 | 1 × Q1, 5 × Q2, 2 × Q3 |

A plurality of route selection scenarios are next described using network 20 of FIG. 2 and the link attributes from Table 1. In the following examples, route selection is performed for a new call that originates at node A for node D, using one or more load balancing criteria. There are two possible routes between nodes A and D, namely a first route, route R1, denoted with 22 along links A-B and B-D, and a second route, route R2, denoted with 24, along links A-C and C-D. For these examples the new call has a bandwidth of 5 M, a service category of Q1 and a priority of P1.

Scenario 1: Service Category as the Only Load Balancing Criterion

In the following scenario, the route for the new call is determined using as the load balancing criteria only the service category. Since the new call has service category Q1, which is the highest service category, we take into account all calls-in-progress with Q1, from all calls along the respective links of the possible routes R1 and R2. Using Table 1 and knowing that the number of hops on each route is 2, the average service category along these routes are:

For route R1: 1×Q1 (link A-B)+3×Q1 (link B-D)=4, which means that an aggregate of four calls have a service category of Q1. The service category average is determined by dividing the aggregate number of calls with a service category of Q1 to the number of hops along the route. This results in a service category average of 4: 2 hops=2.

For route R2: 1×Q1 (link A-C)+1×Q1 (link C-D)=2, which means that an aggregate of two calls have a service category of Q1. The service category average is determined again by dividing the aggregate number of calls with service category=Q1 to the number of hops. This results in a service category average of 2: 2 hops=1. Route R2 is therefore selected for the new call as it offers a path with a smaller average number of service category calls belonging to the same category (Q1).

Scenario 2: User-specified Priority as the Only Load Balancing Criterion

Let's now attempt to connect the same call as in above Scenario 1, using only the call priority as the criterion. In this case, since the new call has a user-specified priority P1, which is the highest priority, we take into account the calls with P1 from all calls along the respective links of the possible routes R1 and R2. Using Table 1 above, and knowing that the number of hops on each route is 2, the route search results will be as follows.

For route R1: 1×P1 (link A-B)+1×P1 (link B-D)=2, which means that an aggregate of two calls have a priority of P1. The priority average is calculated by dividing the aggregate number of calls with priority P1 to the number of hops along that route. This results in a priority average of 2: 2 hops=1.

For route R2: 2×P1 (link A-C)+2×P1 (link C-D)=4, which means that an aggregate of four calls have a priority of P1. The priority average is again determined by dividing the aggregate number of P1 calls to the number of hops along route R2. This results in a priority average of 4: 2 hops=2. Route R1 is therefore selected for the new call as it offers a path with a smaller average number of P1 calls.

Scenario 3: Bandwidth as the Only Load Balancing Criterion

Since in this scenario the load balancing criterion is the bandwidth, the bandwidth average for the routes R1 and R2 should be determined, and the path with the minimum bandwidth utilization is selected. Using Table 1 above, and knowing that the number of hops on each route is 2, the route search results will be as follows.

For route R1: 10 M (link A-B)+25 M (link B-D)=35 M, which means that route R1 has an aggregate bandwidth of 35 M. The bandwidth average is determined by dividing the aggregate bandwidth to the number of hops along that route. This results in an average bandwidth of 35: 2 hops=17.5 M for route R1.

For route R2: 10 M (link A-C)+20 M (link C-D)=30, the average bandwidth is again determined by dividing the aggregate bandwidth to the number of hops along route R2. This results in an average bandwidth of 30: 2 hops=15 M. Route R2 is therefore selected for the new call as it offers a path with less average bandwidth consumed. It is to be noted that load balancing based on bandwidth may also be calculated by dividing the bandwidth utilized on a link by the link capacity (which is 100 M in our example) and aggregating these link bandwidth values for all links of the route. In the above example, this gives the same result:

For Route R1: 10/100+25/100=0.35

For Route R2: 10/100+20/100=0.3

It is to be noted that the above scenarios show simple examples for convenience; in addition, all describe use of only one criterion has to achieve load balancing. Nonetheless, the benefit of this approach is obvious, in that the calls are distributed across the network as desired according to the respective load balancing criterion.

Some operators might desire a higher level of control in terms of load balancing by specifying more than one criteria (e.g. number of calls, priority, service category, bandwidth, etc.) to achieve distribution of calls across their network. For example it might be desirable to pick a route that offers a higher number of calls of a given priority, if the bandwidth and service category averages are lower across that route. In this situation, a score may be calculated for each route, and the route with a better score is selected for the respective call.

Figure 3:
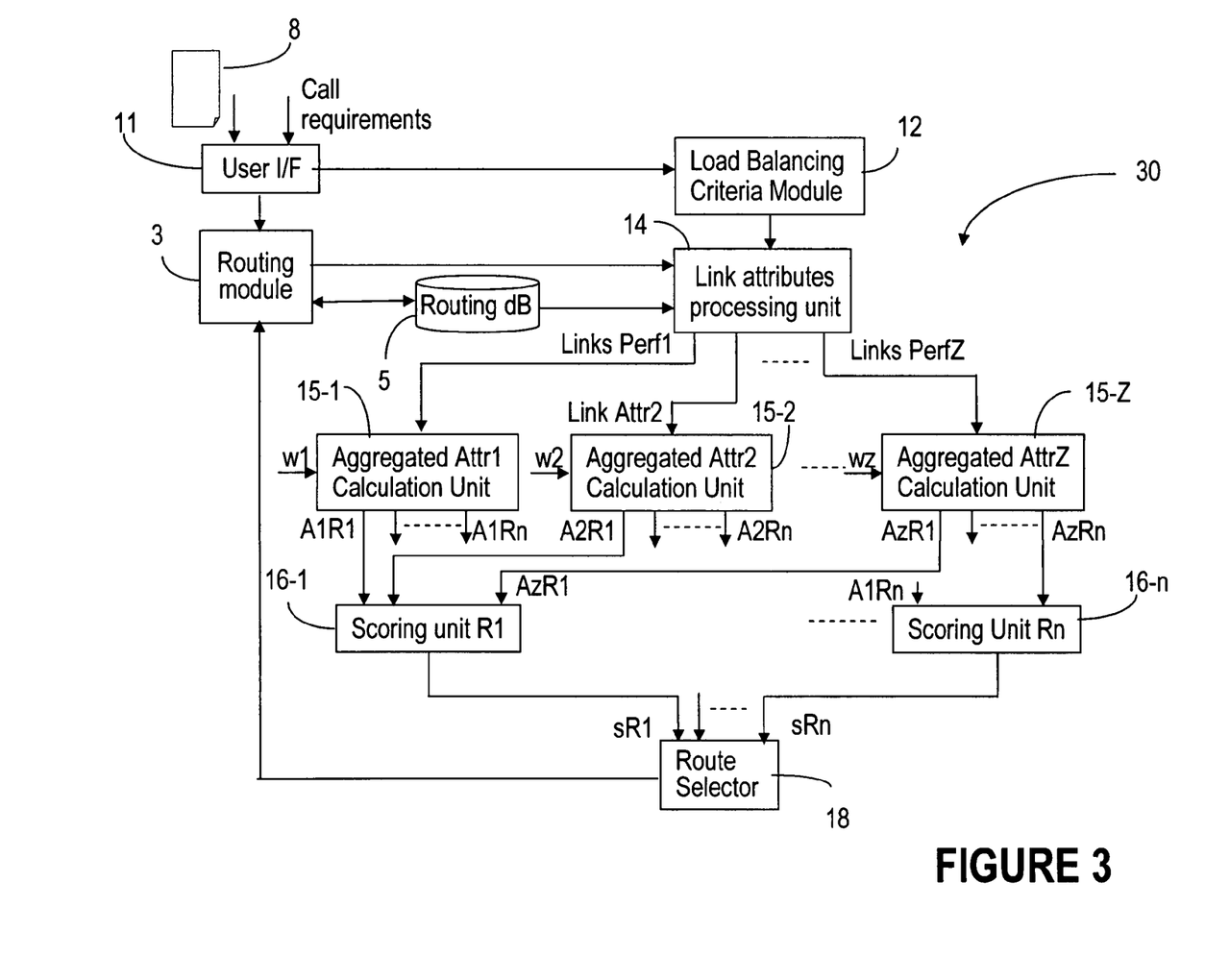
FIG. 3 shows the block diagram of the load balancing system according to another embodiment of the invention.

FIG. 3 illustrates the block diagram of the load balancing system 30 according to another embodiment of the invention, where the system uses a set of criteria for load balancing. In this case, the user specifies a set of criteria to be used for load balancing; the user may specify the criteria set through e.g. a configuration form 8. As discussed in connection with the embodiment of FIG. 1, an aggregated attribute calculation units 15-1 to 15-Z provides a route performance value (e.g. A1R1 or AzRn) for each route R1 to Rn with respect to each attribute A1 to Az.

The load balancing system 30 is also provided with scoring units 16-1 to 16-n connected at the output of the aggregated attribute calculation units 15-1 to 15-n; there are n scoring units operating for n possible routes is n. Each scoring unit 16 calculates a score for a route for the criteria in the user-specified set, taking the respective route performances into consideration. As such, the number of scoring units operating at a certain moment varies with the number of possible routes available for that call.

A scoring unit 16-1 to 16-n compounds the route performances for all possible routes for a given attribute and provides an individual score denoted with sR1 to sRn. In the example in FIG. 3 the set of route performance values used by scoring unit 16-1 are established using call attributes A1 to Az; evidently more or less criteria may be used for scoring route performance. Also, FIG. 3 shows the scoring for route R1 only for simplicity.

It is also to be noted that system 30 also allows the operator/user to specify which attributes to use during path selection and also to determine their order. According to the invention, not only that a plurality of user-selected criteria or criteria subsets may be specified for load balancing, but also the order of applying the criteria may be changed. For example, load balancing using bandwidth may be considered first, possibly followed by hops and then cost. As an optional add-on the user can specify the ability to override a criterion (e.g. bandwidth) based on one or more criteria (e.g. service category, and bandwidth).

According to still another embodiment of the invention, the user can assign (again through a configuration form) weights to each criterion; these are denoted with w1 to wz in FIG. 3. The weights could have decimal values or can be integers. The weights are used for enabling more flexibility in load balancing, according to user or operator specified preferences.

Scenario 4: Load Balancing Using a Set of Criteria

An example for selecting a route using weighted load balancing criteria is given again for the network of FIG. 2, with the link attributes of Table 1. In the following, we will denote the load balancing scores for each criterion using capital letters N for the number of calls, BW for bandwidth, P for priority, and Q for service category; the corresponding lowercase letters are used for the weights attributed to the respective criterion. By way of example also, we use a score of 1 (1 point) for a route if that particular criterion is better along that route; otherwise the respective route gets 0 points. In this case, route R1 receives an individual score of 0 for the bandwidth criterion, since its average bandwidth is 17.5 M, while the average bandwidth of route R2 is only 15 M (see above Scenario 3). For the priority criterion, route R1 receives an individual score of 1, as it offers a path with a lower average number of P1 calls (see Scenario 2). Finally, for the service category criterion route R receives an individual score of 0, since route R2 offers a path with a lower average number of service category calls belonging to the same category Q1 (see Scenario 1).

Let's also assume that the weights used are whole number weights previously specified for load balancing, and that p=5, bw=3 and q=3.

The route score for route R1 is obtained by adding the individual scores weighted as indicated above:

$$ScoreR1 = b \times BW = p \times P + q \times Q = 0 \times 3 + 1 \times 5 + 0 \times 3 = 5$$

Similarly, the route score for route R2 is obtained by adding the weighted individual scores.

$$ScoreR2 = b \times BW = p \times P + q \times Q = 1 \times 3 + 0 \times 5 + 1 \times 3 = 6$$

Route R2 will be selected for the new call in this example, as its weighted load balancing score is 6 versus a load balancing score of 5 for route R1.

According to still another embodiment of the invention, raw numbers can be used for the individual scores instead of giving a 1 or a 0 for a criterion when comparing two routes. For example, in the individual score for BW criterion may be 1.142, i.e. the ratio between the average bandwidth of the two routes (20 M/17.5 M).

Re-routing of existent calls may also be performed in a similar manner. In this case however, the score for the path that carries the call to be re-routed is calculated without that call.

We claim:

1. A method of routing calls across a communication network with per-call load balancing, the method comprising:
   identifying at least two possible alternate routes for a new call;
   determining a first route performance value for each said possible route, for a call attribute corresponding to a bandwidth criterion;
   determining a second route performance value for each said possible route, for a call attribute corresponding to a priority criterion;
   determining a third route performance value for each said possible route, for a call attribute corresponding to a service category criterion;
   selecting a route from the at least two possible alternate routes to carry said new call based on adding together said first route performance value, said second route performance value, and said third route performance value.

2. The method of claim 1, wherein the determining of said first route performance value, said second route performance value, and said third route performance value occurs in a user-defined order.

3. The method of claim 1, wherein determining the third route performance value further comprises:
   counting for each link of said at least two possible alternate routes a number of calls-in-progress that have said call attribute;
   calculating an aggregated attribute by summing the number of calls-in-progress for said at least two possible alternate routes; and
   determining said third route performance value by dividing said aggregated attribute to the number of hops along said respective possible route.

4. The method of claim 1, wherein determining the first route performance value further comprises:
   calculating an aggregated bandwidth by summing bandwidth consumed by all calls-in-progress along each link of said at least two possible alternate routes; and
   determining said first route performance value by dividing said aggregated bandwidth to a number of hops along said at least two possible alternate routes.

5. The method of claim 1, wherein determining the first route performance value further comprises:
   calculating for each link of said at least two possible alternate routes a consumed link bandwidth by summing bandwidth consumed by all calls-in-progress along said link;
   calculating a link bandwidth value by dividing said consumed link bandwidth by link bandwidth capacity; and
   determining said first route performance value by summing said link bandwidth values for all links of said at least two possible alternate routes.

6. The method of claim 1, further comprising:
   re-routing a call-in-progress established along a current route across said network between a source and a destination to the selected route.

7. The method of claim 6, wherein the re-routing of the call-in-progress is determined without considering any route performance values for said current route.

8. The method of claim 1, further comprising:
   assigning a weight to each route performance value based on user-specified preferences for each route performance value.

9. The method of claim 8, further comprising:
   assigning different weights to at least two of the route performance values.

10. A system that performs load balancing of calls in a communication network, the system comprising:
    a routing module that selects a list of possible alternate routes between a user-specified source and a destination;
    a load balancing criteria module that receives a configuration form from a user that specifies selection criteria used for load balancing;
    a link attribute processing unit that receives the selection criteria from the load balancing criteria module and the list of possible alternate routes from the routing module;
    a first aggregated attribute calculation unit that determines a first route performance value for the list of possible alternate routes for a call attribute corresponding to a bandwidth criterion;
    a second aggregated attribute calculation unit that determines a second route performance value for the list of possible alternate routes for a call attribute corresponding to a priority criterion;
    a third aggregated attribute calculation unit that determines a third route performance value for the list of possible alternate routes for a call attribute corresponding to a service category criterion; and
    a route selector that selects a route for a new call from said list of possible alternate routes, based on adding together said first route performance value, said second route performance value, and said third route performance value.

11. The system of claim 10, wherein each of the aggregated attribute calculation units assigns a weight to each route performance value based on user-specified preferences for each route performance value.

12. The system of claim 11, wherein different weights are assigned to at least two of the route performance values.

13. A system that performs load balancing of calls between a source and a destination within a communication network, the s stem comprising:
- a routing module that selects a list of possible alternate routes between said source and said destination;
- a load balancing criteria module that receives a configuration form from a user that specifies selection criteria used for load balancing;
- a link attribute processing unit that receives the selection criteria from the load balancing criteria module and the list of possible alternate routes from the routing module;
- a first aggregated attribute calculation unit that determines a first route performance value for the list of possible alternate routes for a call attribute corresponding to a bandwidth criterion;
- a second aggregated attribute calculation unit that determines a second route performance value for the list of possible alternate routes for a call attribute corresponding to a priority criterion:
- a third aggregated attribute calculation unit that determines a third route performance value for the list of possible alternate routes for a call attribute corresponding to a service category criterion;
- a scoring unit that provides a route score, based on adding together said first route performance value, said second route performance value, and said third route performance value for each route in the list of possible alternate routes; and
- a route selector that selects a route for a new call to be routed between said source and said destination, based on said route score.

14. The system of claim 13, wherein each of the aggregated attribute calculation units assigns a weight to each route performance value based on user-specified preferences for each route performance value.

15. The system of claim 14, wherein different weights are assigned to at least two of the route performance values.

* * * * *

UNITED STATES PATENT AND TRADEMARK OFFICE
CERTIFICATE OF CORRECTION

| | | |
|---|---|---|
| PATENT NO. | : 7,885,398 B2 | Page 1 of 1 |
| APPLICATION NO. | : 11/367401 | |
| DATED | : February 8, 2011 | |
| INVENTOR(S) | : Neeraj Chandra and Gerardo Martin Espinosa | |

It is certified that error appears in the above-identified patent and that said Letters Patent is hereby corrected as shown below:

In the Claims:
Claim 13, column 11, line 3, please change "s stem" to --system--.

Signed and Sealed this
Twenty-ninth Day of March, 2011

David J. Kappos
*Director of the United States Patent and Trademark Office*